T. W. MILLER.
PROCESS OF MANUFACTURING SEAMLESS RUBBER GLOVES.
APPLICATION FILED SEPT. 3, 1914.
1,146,638.
Patented July 13, 1915.
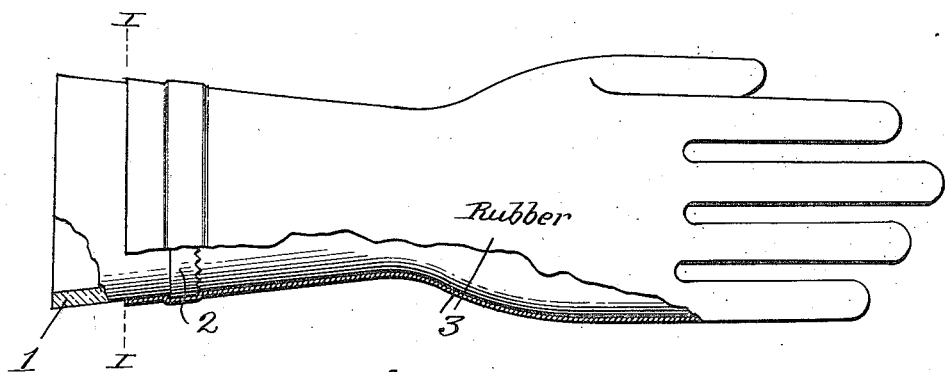
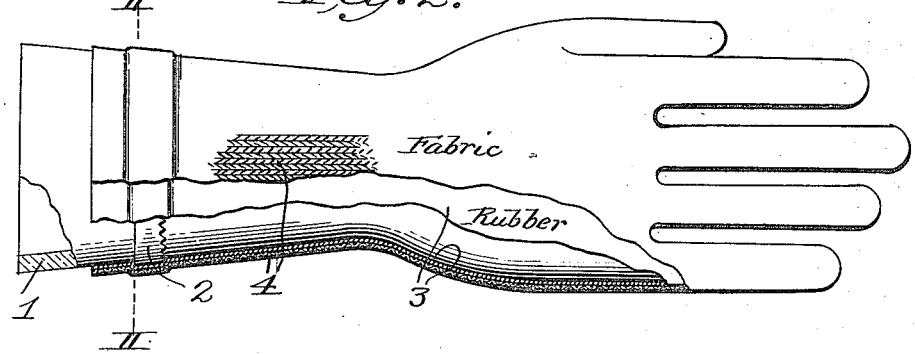
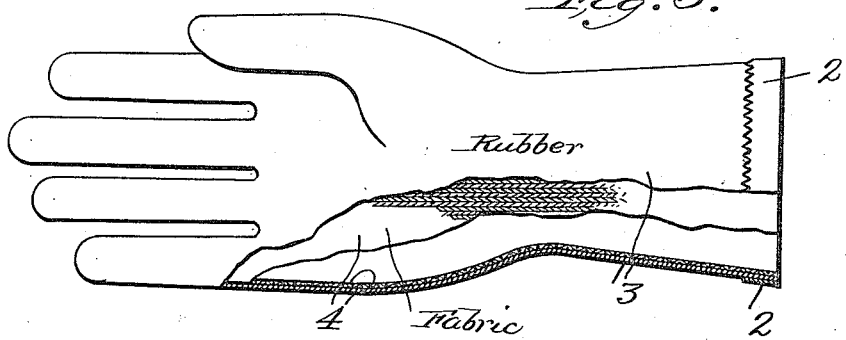

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

PROCESS OF MANUFACTURING SEAMLESS RUBBER GLOVES.

1,146,638.     Specification of Letters Patent.     Patented July 13, 1915.

Application filed September 3, 1914. Serial No. 859,993.

*To all whom it may concern:*

Be it known that I, THOMAS W. MILLER, a citizen of the United States, residing at Ashland, in the county of Ashland and State of Ohio, have invented certain new and useful Improvements in Processes of Manufacturing Seamless Rubber Gloves, of which the following is a specification.

My invention relates to seamless rubber gloves, and has for its objects to provide certain improvements in said gloves and in the method of manufacturing the same, as will be hereinafter more definitely pointed out and claimed.

More specifically my invention relates to the production of a glove of this character having its inner surface, in whole or in part, provided with a lining of textile material, such as stockinet, the latter being somewhat elastic to provide the necessary give in using the article.

In the accompanying drawing: Figure 1 is an elevation of an ordinary form used in the manufacture of seamless rubber gloves, a glove being shown formed thereon and partly broken away. Fig. 2 is a similar view showing the fabric lining applied to the exterior surface of the glove while on the form, the same being also partly broken away. Fig. 3 is a view of the glove removed from the form and reversed to bring the fabric lining upon the inside, said view being also partly broken away.

In the said drawing, the reference numeral 1 denotes the ordinary form used in the manufacture of seamless rubber gloves, said gloves being formed in the usual manner by dipping the form into a rubber solution in the usual manner to apply a plurality of coatings of rubber thereto.

Heretofore it has been the practice to apply at the wrist end of the glove a strip of material to form a finish, said strip being applied to the exterior of the glove, and when said glove is vulcanized and then stripped from the form, the outer surface of the glove when on the form would constitute the outer surface of the finished glove.

In my present process of manufacturing these gloves, it is my intention to reverse the glove when finished, thus making the inner surface of the glove when on the form the outer surface of the finished glove, and in the preliminary forming of the glove upon the form, I first apply to the form a strip of rubber 2, and then proceed with the usual dipping operation, whereby said strip will be positioned upon the interior surface of the glove when on the form, as shown in Figs. 1 and 2. In this dipping operation the form is dipped into the solution so as to be coated for a short distance above the strip 2, as indicated by the line I—I. When the form has been dipped sufficiently for the desired thickness of the rubber glove 3, and has been permitted to dry in the usual manner, the surplus on the form beyond the strip 2 is cut away along the line II—II, Fig. 2. The glove 3 is then vulcanized, and after vulcanization there is applied to its exterior surface a covering of fabric 4, which may be applied by frictioning one surface of the fabric, thereby to attach it to the surface of the rubber glove 3. With this fabric so applied, the glove is then stripped from the form, and in the act of stripping necessarily is reversed, bringing the fabric 4 upon the inside thereof and the finished strip 2 upon the outside, as shown in Fig. 3. This produces as a finished article a seamless rubber glove having its interior surface provided with a lining of more or less elastic fabric, such as stockinet, and having its wrist portion at its end provided with a finishing strip in the usual manner.

While I have shown and described the glove as provided with a lining of fabric 4 throughout its entire area, it will be understood that portions only of the glove may be so lined. For instance, the wrist portion may be lined and the fingers and thumb at the crotch provided with lining pieces, or the tips of the fingers and thumb may also be lined. In fact I do not wish to limit myself in any particular as to the area of the interior surface to be lined, as said lining may extend over the entire surface or any part thereof.

The finishing strip 2 may be applied in the shape of a strip of rubber to the form 1, or may be in the shape of a stripe of india ink or other suitable material, stamped upon the wrist of the form 1, which india ink would adhere to the rubber in the process of dipping, and being of contrasting color would form a finishing strip for the completed article. Or said strip may be applied to the form 1 by the well known transfer process. In using either the india ink or other material or the transfer process for forming this finishing strip, the glove when finished will not be reinforced at its wrist end, as will be the case when a strip of rubber is used, the finishing strip in the case of the india ink or transfer being, of course, flush with the surface of the rubber glove, but giving the glove the desired finished appearance.

While I prefer to apply the stockinet or other fabric 3 after the glove has been vulcanized, and to apply the same by means of rubber cement, still it may be applied prior to vulcanization, in which event the frictioned surface of the fabric will cause it to adhere most firmly to the glove. Or it may be applied after vulcanization and the same subjected to a slight additional vulcanization in order to effect a close union. Nor do I limit myself to the application of the fabric to the glove while on the form 1, as the same may be applied after its removal therefrom.

Having thus described my invention, what I claim as new and desire to secure by Letters Patent, is:—

1. The method of making seamless rubber gloves, which consists in forming the same upon a form by dipping, then applying to the exterior surface thereof a fabric, and finally reversing said glove to bring the fabric inside.

2. The method of making seamless rubber gloves, which consists in forming the same upon a form by dipping, then vulcanizing the same, then applying to the exterior surface thereof a fabric, and finally reversing said glove to bring the fabric inside.

3. The method of making seamless rubber gloves, which consists in placing upon a form a finishing strip, then dipping said form in a rubber solution to form a rubber glove thereon with said finishing strip upon the inside thereof, then removing the surplus at the wrist portion, so that said finishing strip is at the wrist end of the glove, then vulcanizing said glove and finally reversing said glove to bring said finishing strip upon the outside thereof.

4. The method of making seamless rubber gloves, which consists in placing upon a form a finishing strip, then dipping said form in a rubber solution to form a rubber glove thereon with said finishing strip upon the inside thereof, then vulcanizing said glove, then applying to the exterior surface of the glove a fabric, and finally reversing said glove to bring the fabric inside and the finishing strip outside.

In testimony whereof I have hereunto set my hand in the presence of two subscribing witnesses.

THOMAS W. MILLER.

Witnesses:
C. D. HUBLER,
W. H. BALCH.